United States Patent

Brown et al.

Patent Number: 5,331,261
Date of Patent: Jul. 19, 1994

[54] REGENERATIVE BRAKING PROTECTION FOR AN ELECTRICALLY-PROPELLED TRACTION VEHICLE

[75] Inventors: Herbert J. Brown; Ronald F. Griebel; Ajith K. Kumar; Stuart W. McElhenny, all of Erie, Pa.; Dean S. Grinch, Dublin, Ohio

[73] Assignee: General Electric Company, Schenectady, N.Y.

[21] Appl. No.: 15,326

[22] Filed: Feb. 9, 1993

Related U.S. Application Data

[63] Continuation of Ser. No. 630,698, Dec. 20, 1990, abandoned.

[51] Int. Cl.$^5$ .......................... H02P 3/14; B61C 17/12
[52] U.S. Cl. .................. 318/376; 246/182 A; 318/371
[58] Field of Search ............... 328/171; 307/551, 561, 307/565, 540, 544, 521, 520; 330/302; 333/172; 335/216; 246/182 A, 182 B, 182 C; 310/211, 201, 103, 54; 318/587, 371, 375, 370, 372, 376, 759; 191/2, 4

[56] References Cited

U.S. PATENT DOCUMENTS

| | | | |
|---|---|---|---|
| 3,532,908 | 10/1970 | Jennings | 307/521 |
| 3,736,880 | 6/1973 | Ross | 318/587 |
| 3,842,751 | 10/1974 | Thornten | 335/216 |
| 3,868,548 | 2/1975 | Grundy | 246/182.C |
| 4,057,753 | 11/1977 | Perry et al. | 318/376 |
| 4,904,918 | 2/1990 | Bailey | 318/759 |
| 5,041,745 | 8/1991 | Raso | 367/520 |

Primary Examiner—William M. Shoop, Jr.
Assistant Examiner—John W. Cabeca
Attorney, Agent, or Firm—Marvin Snyder

[57] ABSTRACT

In an electrical propulsion system on board a moving traction vehicle (such as a rapid transit rail car) having current collectors in contact with an energized third rail, controllable switch means is used to connect the system to the current collectors. From time to time the current collectors traverse gaps between adjacent sections of the third rail, in which event regenerative braking operation of the system will be prevented unless the next third rail section is energized by a wayside source of voltage. The switch means comprises the parallel combination of a diode that conducts current when the system is operating in a motoring mode and a reversely-poled thyristor that conducts regenerative braking current once a firing signal is applied thereto. To detect the energized status of the third rail, an electrical filter network is excited by the third rail voltage and derives an output value representative of the amplitude of an a-c ripple component of such voltage having a fundamental frequency that characterizes the wayside voltage source, and after each third rail gap is traversed a firing signal is applied to the thyristor as soon as this value exceeds a predetermined minimum level.

28 Claims, 8 Drawing Sheets

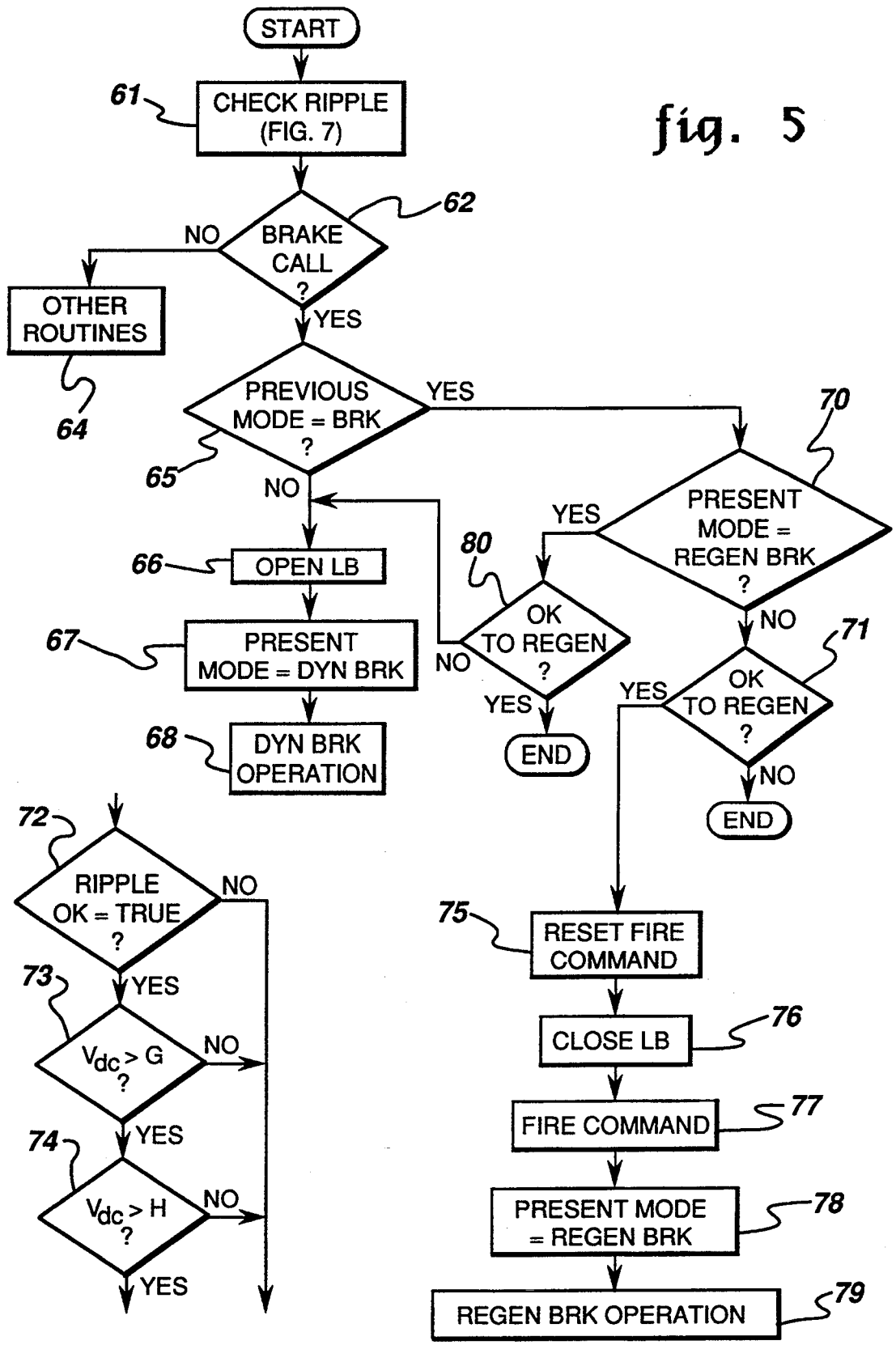

REGENERATIVE BRAKING PROTECTION FOR AN ELECTRICALLY-PROPELLED TRACTION VEHICLE

This application is a continuation of application Ser. No. 07/630,698, filed Dec. 20, 1990 now abandoned.

BACKGROUND OF THE INVENTION

This invention relates generally to electrical propulsion systems used on traction vehicles (such as self-propelled rapid transit rail cars) to propel and retard the vehicle, the electric power input to the system being obtained from wayside conductors (e.g., a third rail) normally energized by direct current derived from electric power sources located at various stations along the right-of-way that the vehicle will travel, and it relates more particularly to means for detecting whether or not the wayside conductor with which the vehicle is in contact is so energized and for preventing any "regenerative" braking operation of the propulsion system if the wayside conductor is not otherwise energized.

A typical traction vehicle propulsion system comprises two pairs of electric traction motors, with the rotatable shafts of each pair being mechanically coupled through suitable gearing to the respective axle-wheels sets of a separate one of the two trucks that support the vehicle, two controllable electric power converters each having relatively positive and negative direct current (d-c) source terminals and a set of load terminals connected to a different pair of traction motors, a bi-directional current path including an electro-mechanical line switch or circuit breaker for connecting the d-c terminals of both converters to a set of current collectors protruding from the vehicle in sliding contact with a normally energized wayside source of unipolarity voltage having a relatively low, constant magnitude, and suitable control means for operating the converters either in a propulsion (motoring) mode when acceleration or constant speed of the vehicle is desired, or in an electrical retarding (braking) mode when deceleration is desired. Preferably the traction motors are three-phase alternating current (a-c) induction motors, the converters are three-phase voltage source inverters, and a low pass electrical filter is connected between the aforesaid line switch and the d-c terminals of the inverters.

In its motoring mode of operation, each inverter is so controlled that the unipolarity voltage applied to its source terminals is converted into three-phase alternating voltage of variable fundamental frequency and amplitude at its load terminals, and the a-c traction motors respond by producing torque to accelerate the vehicle or maintain its speed as desired. In the alternative electrical braking mode of operation, the inverter is so controlled that each motor acts as a generator driven by the inertia of the vehicle and supplies electric power which flows in a reverse direction through the inverter and appears as direct current and unipolarity voltage at the source terminals. As this electrical energy is used or dissipated, the traction motors respond by absorbing kinetic energy and slowing the vehicle.

Electrical braking is achieved by a combination of dynamic and regenerative braking. Dynamic braking is effected by selectively connecting a dynamic braking resistance in parallel relationship with the d-c source terminals of the inverter. This resistance receives current from the inverter, converts the electrical energy to thermal energy, and dissipates the resulting heat. Regenerative braking, on the other hand, is effected by returning to the wayside source power flowing in a reverse direction through the inverter during electrical braking. The regenerated power can be advantageously utilized by the propulsion systems of other traction vehicles sharing the same wayside source of voltage and operating in their motoring mode. The two electrical braking modes can be combined in desired proportions, this mixing process being commonly referred to as "blending." An electrical propulsion system, including a voltage source inverter for supplying a-c traction motors, is disclosed in U.S. Pat. No. 4,904,918—Bailey, Kumar and Plette, granted on Feb. 27, 1990, and assigned to General Electric Company.

The wayside source of unipolarity voltage usually comprises two or more low-voltage d-c power generating plants or stations located near the right-of-way traveled by the traction vehicle. In a typical station the d-c power is derived from commercially available three-phase a-c electric power by means of a polyphase power transformer in combination with an uncontrolled power rectifying bridge having a set of a-c input terminals connected to the transformer secondary windings (i.e., the low voltage windings) and a pair of d-c output terminals across which the unipolarity voltage is produced. At each station one of the d-c terminals of the rectifying bridge (conventionally the one whose potential is negative with respect to the other d-c terminal) is grounded, and suitable means is provided for connecting the other terminal to a plurality of bare electrical conductors extending along different sections of the right-of-way. Proximate ends of the conductors in adjacent sections are separated from each other by relatively short, insulating gaps. Such gaps are commonly found at track crossings and switches and at other strategic locations along the route traveled by the vehicle. As the vehicle is driven by its electrical propulsion system along each different section of the right-of-way, its current collectors are in sliding contact with the corresponding conductor until a conductor gap is reached, at which point the vehicle will be unpowered for a relatively short distance (e.g., as short as four or five feet) until its leading current collector makes contact with the wayside conductor associated with the next section of the right-of-way. This external conductor is usually a third rail parallel to the pair of rails forming the track on which the vehicle travels, in which case the gaps are simply air gaps and the current collectors are spring-biased "shoes" respectively supported in cantilever fashion on the two trucks of the vehicle.

There are certain times when the wayside conductor in one section of the right-of-way will be temporarily disconnected from its normal voltage source for track maintenance work or for some other purpose. In this event, the wayside conductor is intended to be de-energized or "dead." If a vehicle enters such a de-energized section while its electric power converter is operating in a regenerative braking mode, there is a possibility that the regenerative current from the vehicle will raise the electrical potential on the wayside conductor to an undesirably high level, thereby endangering maintenance people who believe the conductor is dead. In order to prevent this hazard from occurring, suitable means for detecting whether or not the conductor is energized by a power generating station and for preventing regenerative braking if the conductor is not so energized are desired.

It is known in the prior art, as disclosed in U.S. Pat. No. 4,057,753, to provide a permissive control signal which is inserted into the electrical power supplied by each wayside generating station to the vehicle for establishing when regenerated power may safely be returned from the vehicle to the wayside conductor.

It is also known in the prior art, as described in U.S. Pat. No. 4,326,154, to open the line switch in the current path between the electric power converter and the current collectors on board the vehicle as these current collectors traverse each wayside conductor gap every time the vehicle moves from section to section of the right-of-way, thereby preventing either motoring or regenerative braking operation of the propulsion system as the vehicle enters the next section. After the leading current collector makes contact with the wayside conductor of the next section, the line switch is not reclosed until voltage is detected on the current collectors and a current sensor indicates that appreciable current is flowing to auxiliary electrical load circuits on the vehicle.

The above-referenced prior art regenerative braking protective apparatus has shortcomings. If the propulsion system were operating in a regenerative braking mode and the traction vehicle were traveling at a relatively high speed (e.g., 40 MPH) as the current collectors pass through a gap between a first energized wayside conductor and a second de-energized conductor, the gap would be traversed in an interval of time (e.g., 70 milliseconds) that is shorter than a typical opening time (e.g., 100 milliseconds) of a conventional line switch. Consequently, an undesirable spike of high voltage could be applied to the de-energized conductor before the line switch has time to open the current path between the converter and the current collectors. Furthermore, if the wayside conductor were disconnected from its power generating station while in contact with a vehicle whose propulsion system is operating in a regenerative braking mode, the regenerative current would fool the protective apparatus so that neither the current-collector voltage detector nor the auxiliary load current sensor would cause the line switch to open.

It is known in the prior art relating to electrical propulsion systems for trolley buses to interrupt regenerative braking current in the bi-directional current path between each of two trolley poles and an electric power converter whenever the tandem trolley poles of the bus traverse insulator gaps in a pair of overhead power supply lines and thereafter to permit such current to be conducted to the power lines of the next section of right-of-way only if the unipolarity voltage across such lines has proper polarity and magnitude and is not decreasing. See U.S. Pat. No. 4,453,113 wherein the bi-directional path includes a diode bridge to ensure that the polarity of the voltage applied to the d-c source terminals of the converter during motoring operation will not change if line voltage polarity changes, a pair of the diodes are shunted by thyristors poled to conduct regenerative current, and a lightning arrestor capacitor is connected between the trolley conductors. During regenerative braking operation, both thyristors change from conducting to non-conducting states whenever the trolleys come to the insulator gap because current in the trolley conductors then decreases abruptly to zero and the resulting increase of voltage across the lightning arrestor capacitor puts a reverse bias on the thyristors. Later, the thyristors are returned to their conducting states in response to the concurrence of a number of conditions: the sensed line voltage has proper polarity and magnitude and is not decreasing; traction motor current exceeds a predetermined threshold magnitude; and the bus is moving faster than a predetermined speed.

SUMMARY OF THE INVENTION

A general objective of the present invention is to provide improved regenerative braking protection for the electrical propulsion system of a traction vehicle normally powered by an external source of unipolarity voltage delivered to the vehicle via a sectionalized wayside conductor.

Another objective is to provide improved regenerative braking protective means that is operative in response to the vehicle moving past a gap between two adjacent sections of the wayside conductor to prevent supplying regenerative braking current to the second section if disconnected from the wayside voltage source, the protective means being characterized by its high speed of operation and its reliability.

A further objective is the provision, on board an electrically propelled traction vehicle, of improved means effective whenever the vehicle's propulsion system is operating in an electrical braking mode for detecting whether or not a wayside conductor section with which the vehicle is in contact is energized by a wayside source of unipolarity voltage.

Yet another objective is to provide an improved electrical filter for sensing an a-c ripple component of predetermined frequency in a unipolarity voltage, the filter being characterized by the sharpness, and selectivity of its filtering action.

In carrying out the invention in one form, an electrical propulsion system on board a transit vehicle includes a controllable electric power converter having a set of load terminals adapted to be connected to at least one traction motor. The converter has alternative motoring and electrical braking modes of operation. Current collectors on the vehicle are disposed in sliding contact with a sectionalized external conductor (e.g., a third rail) that extends along a dedicated right-of-way traveled by the vehicle, each section of the conductor being energized by an associated wayside source of unipolarity voltage to which it is normally connected. The current collectors and d-c source terminals of the converter are interconnected by controllable electric switch means having alternative conducting and non-conducting states.

In one aspect of the invention, the controllable switch means comprises a normally-closed circuit breaker in series with the parallel combination of a solid-state uncontrolled unidirectional electric valve that is poled to conduct direct current whenever the converter is operating in its motoring mode and an inversely-poled, solid-state controlled unidirectional electric valve that is able, once a suitable firing signal is applied to its control electrode, to conduct regenerative braking current during the electrical braking mode of operation.

The controlled valve automatically and rapidly changes from conducting to non-conducting states whenever regenerative current decreases to zero, as will occur whenever the vehicle current collectors enter an intersectional gap in the external conductor while regenerative braking is in effect. Upon leaving such a gap, the controlled valve will remain in its nonconducting state until another firing signal is generated. If the next conductor section is "live," i.e., connected to its wayside voltage source, and if the converter continues to operate in a braking mode, detecting means will provide an enable signal that causes another firing signal to be applied, thereby returning the controlled valve to its regenerative current conducting state. Because the conducting-to-non-conducting state change of the controlled valve occurs automatically (without needing current sensing means to trigger such action), very rapidly, and without moving parts, this aspect of the invention is a highly reliable and durable means for realizing the desired result of preventing regeneration into an external conductor section that is "dead" (i.e., disconnected from its wayside voltage source) whenever the current collectors traverse a gap between an energized section and a deenergized section of the wayside conductor.

In another aspect of the invention, the aforesaid detecting means comprises voltage ripple detecting means coupled to the vehicle's current collectors for providing the enable signal only if any one of the current collectors is in contact with an external conductor section energized by voltage having an a-c ripple component of predetermined frequency and at least a predetermined threshold magnitude, such frequency being characteristic of the wayside voltage sources. After an enable signal has been provided, it will terminate any time the conductor section is disconnected from its wayside voltage source or when the current collectors enter another intersectional gap. If regenerative braking were in effect when the vehicle is traveling between consecutive external conductor gaps, loss of the enable signal would cause the aforesaid circuit breaker to open, and regenerative current would then decrease to zero. When the converter is operating in the braking mode, there is no ripple of the aforesaid characteristic frequency in the voltage at its source terminals, and therefore the converter voltage will not cause the ripple detector to continue providing an enable signal after the external conductor section is disconnected from its wayside voltage source.

In yet another aspect of the invention, the ripple detecting means comprises an electrical filter network for deriving an output value representative of the amplitude of the characteristic-frequency ripple component of the external conductor voltage, and level detecting means for providing the enable signal if such output value exceeds a level corresponding to the aforesaid threshold amplitude. The filter network comprises a bandpass type active filter characterized by maximally flat passband magnitude response, a center frequency substantially equal to the characteristic frequency, and a −3 decibels bandwidth that is a relatively small percentage of the center frequency, rectifying means for rectifying any signal passing through the bandpass filter, and signal smoothing means for deriving the aforesaid output value which varies with the average magnitude of the rectified signal. The bandpass filter is connected to the vehicle's current collectors via a high-pass type filter characterized by equal-ripple passband magnitude response and a −3 decibels cutoff frequency that is lower than the center frequency of the bandpass filter.

The invention will be better understood and its various objectives and advantages will be more fully appreciated from the following description taken in conjunction with the accompanying drawings.

BRIEF DESCRIPTION OF THE DRAWINGS

FIGS. 5–8 are flowcharts that explain how the controller of FIG. 2 is programmed in accordance with the present invention to provide regenerative braking protection.

DETAILED DESCRIPTION OF THE INVENTION

Figure 1:
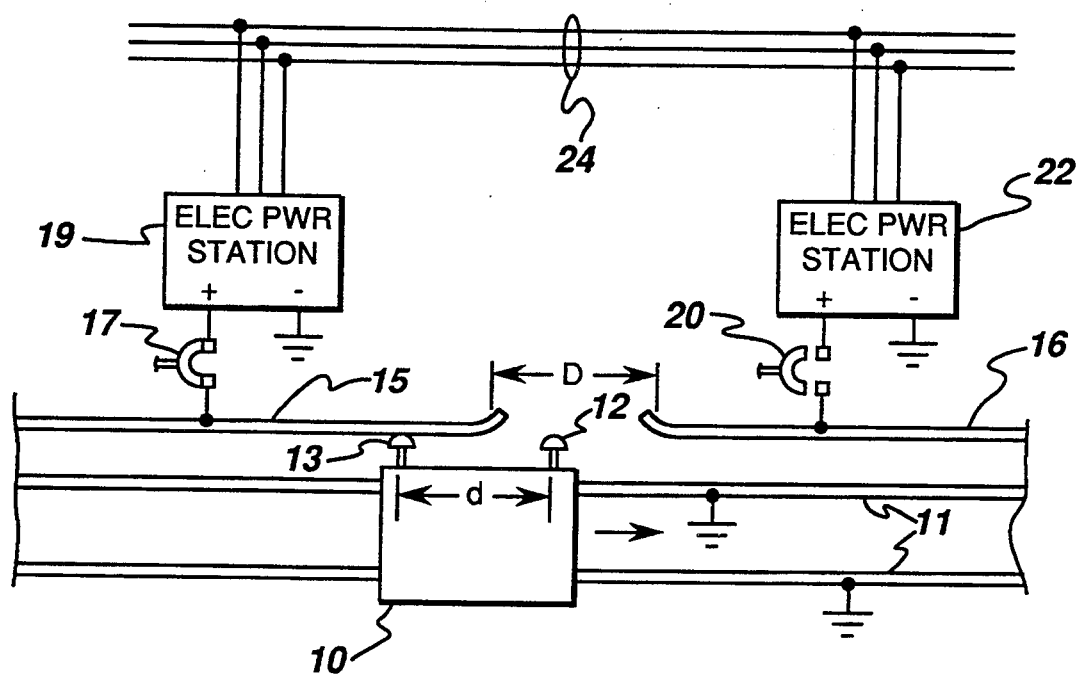
FIG. 1 is a block diagram of an electrically propelled rapid transit vehicle on a track the third rail of which is sectionalized for energization by separate wayside voltage sources.
Figure 2:
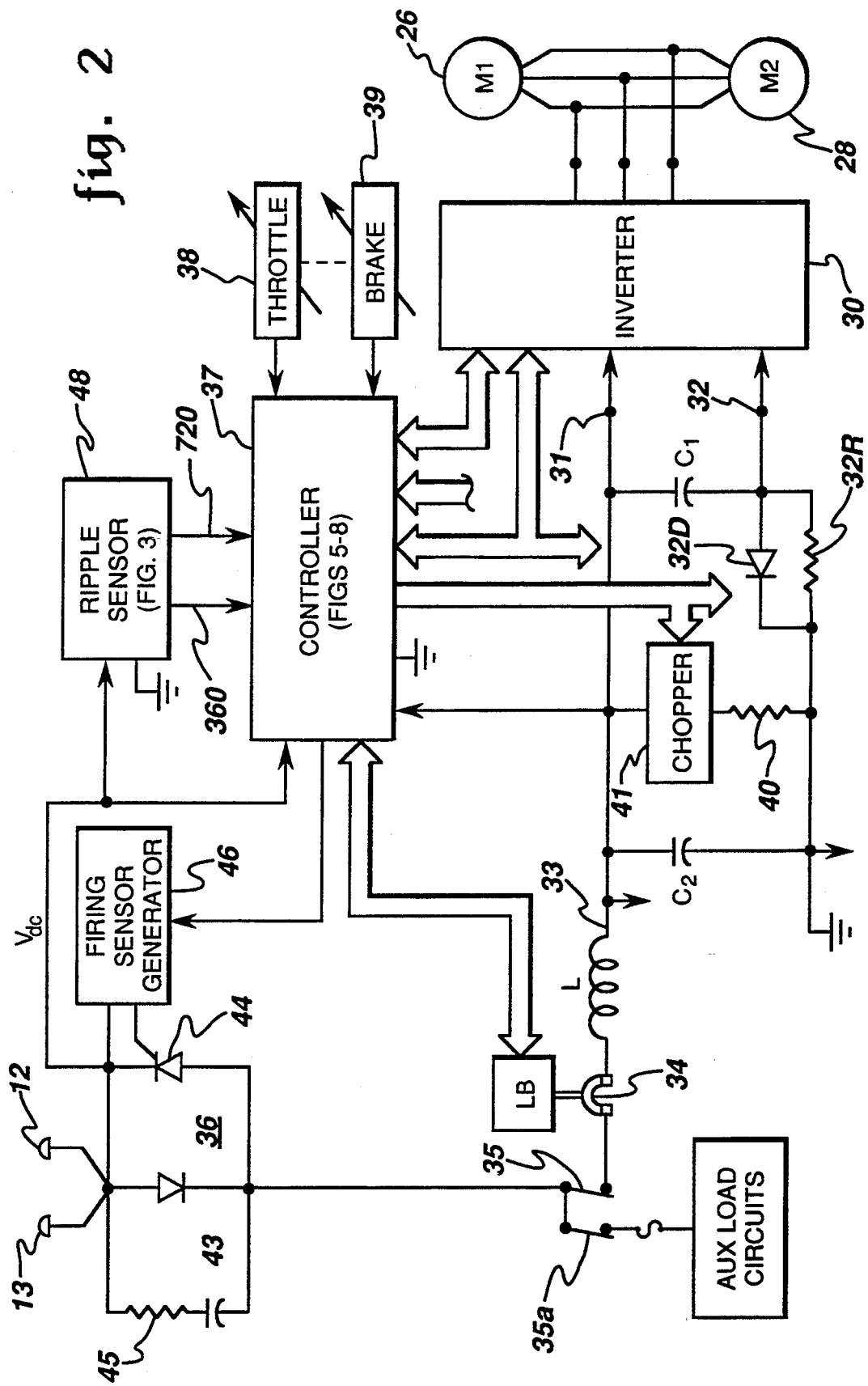
FIG. 2 is a schematic circuit diagram of the propulsion system on board the vehicle shown in FIG. 1, which system includes the presently preferred embodiment of the subject invention.

FIG. 1 illustrates symbolically the self-propelled rapid transit vehicle 10 having flanged wheels (not shown) that are guided by a spaced-apart pair of parallel steel rails 11 of a track in the right-of-way traveled by the vehicle. On board the vehicle there is an electrical propulsion system that includes at least one traction motor drivingly coupled to the vehicle wheels. The propulsion system is shown in FIG. 2 which will soon be described. To enable its propulsion system to receive electrical power from a stationary wayside source of unipolarity voltage, the vehicle 10 is equipped with a pair of conventional spring biased current collectors or pick-up shoes 12 and 13 that protrude laterally from the respective trucks of the vehicle. As the vehicle 10 moves on the guide rails 11 each of its shoes 12 and 13 make sliding contact with normally energized bare electrical conductors that extend along different sections of the right-of-way in parallel relationship to the track. The external conductors are commonly referred to as a third rail, and FIG. 1 illustrates two adjacent sections 15 and 16 of such a rail. The external conductor 15 is connected via a suitable circuit interrupter 17 to the relatively positive output terminal of an electric power station 19 that serves as a wayside source of unipolarity voltage. The negative output terminal of the station 19 is grounded, as are both of the rails 11. Another circuit interrupter 20 is provided for connecting the external conductor 16 either to the same electric power station 19 or, as is shown in FIG. 1, to a different station 22.

Each of the electric power stations 19 and 22 typically comprises an uncontrolled power rectifying bridge having a pair of relatively positive and negative d-c output terminals, and a set of a-c input terminals connected to the secondary windings of polyphase a-c power transforming means. The primary windings of the power transforming means are in turn energized by three-phase electricity supplied at commercial power frequencies (e.g., 60 Hz) over high tension power lines 24. It is common practice to arrange the transformer secondary windings in one of two alternative configurations: either three phases, in which case a three-phase double-way power rectifying bridge is used; or six phases, in which case a six-phase double-way power rectifying bridge is used. In either case, the power station will provide a relatively constant unipolarity output voltage the average magnitude of which is typically in a range from 600 volts normal to 800 volts maximum.

Normally both of the circuit interrupters 17 and 20 are closed, and therefore both of the third rail conductors 15 and 16 are in fact energized by the wayside voltage source(s). Proximate ends of the adjacent conductors 15 and 16 are physically separated from each other by a distance D, commonly referred to as a third rail gap. The air gap D insulates the conductor 16 from the conductor 15 and enables either one to be electrically isolated from the other when maintenance work is being performed on the associated section of the track. In FIG. 1 the circuit interrupter 20 is shown in its open state, whereby the conductor 16 is not now energized by the wayside voltage source 22. Note that the length of each third rail gap D is greater than the distanced between the two pick-up shoes 12 and 13. Consequently, as the vehicle 10 moves from one section of the right-of-way to the next section and each of its two shoes 12, 13 traverse the intersectional gap in the third rail, the trailing shoe 13 (assuming the direction of movement indicated by the arrow in FIG. 1) will always separate from the wayside conductor 15 before its leading shoe 12 reaches the adjacent conductor 16. The effective length of the third rail gap is D-d, a distance that can be as short as four or five feet in practice. So long as at least one of the two shoes 12, 13 of the vehicle 10 is in sliding contact with an energized section of third rail (conductor 15 in FIG. 1), the shoe voltage (Vdc) will equal the unipolarity voltage of the wayside source (station 9) to which this section is connected.

The electrical propulsion system of the vehicle 10 is illustrated in block form in FIG. 2. It comprises at least one pair of traction motors 26 and 28 electrically connected in parallel and mechanically coupled by suitable gearing to the respective axle-wheels sets of a first one of the two trucks that support the vehicle, and at least one controllable electric power converter 30 having a set of load terminals electrically connected to both motors. The converter 30 also has a pair of relatively positive and negative d-c terminals 31 and 32. Preferably the negative terminal 32 and the vehicle body ground are interconnected by means of the parallel combination of a resistor 32R and a diode 32D poled to conduct current in a direction from terminal 32 to ground, and the positive terminal 31 of the converter 30 is connected to both of the previously described pick-up shoes 12 and 13 of the vehicle by means of a bi-directional current path including a line 33, a conventional electro-mechanical circuit breaker 34, an isolating switch 35, and controllable electric switch means 36 having alternative conducting and non-conducting states. Preferably, each of the traction motors 26 and 28 is a three-phase a-c induction motor having a full-load rating on the order of 300 horsepower more or less, and the converter 30 is a three-phase voltage source inverter of a conventional design. A controller 37 is electrically coupled to the inverter 30 which is thereby caused to operate either in a motoring mode under the control of an associated throttle handle 38 or alternatively in an electrical braking mode under the control of an associated brake handle 39. In modern practice the various functions performed by the controller 37 are implemented by a suitably programmed microcomputer.

During motoring, i.e. when electrical power is being conveyed from the wayside voltage source to the traction motors, direct current is supplied to the inverter 30 through its d-c terminals 31 and 32, and the inverter acts to convert this direct current into alternating current supplied through its load terminals to the motors 26 and 28. In this operating mode the inverter is so controlled as to vary the amplitude and frequency of the alternating voltage at its a-c load terminals to provide the needed acceleration or constant speed of the vehicle 10. The well-known pulse width modulation control strategy can be used. In modern practice, GTO thyristors are preferred as the main controllable electrical valves of the inverter, thereby avoiding the need for auxiliary thyristors and commutation circuits.

As was explained in the background section above, electrical braking of the vehicle 10 is achieved by a combination of dynamic and regenerative braking. Dynamic braking is effected by means of a dynamic braking circuit connected in parallel relationship to the d-c terminals 31 and 32 of the inverter 30. This circuit comprises a series combination of a resistor 40 and an electric power chopper 41 of conventional design. During electrical braking each of the traction motors 26 and 28 operates as an electrical generator driven by the inertia of the vehicle 10, returning power to the propulsion system. This return power flows through the inverter 30 in a reverse direction from the direction of flow during motoring, and appears as unipolarity voltage and direct current at the d-c terminals 31 and 32. During dynamic braking at least some of the braking current is diverted through resistor 40 where electric energy is dissipated in the form of heat. For controlling current in the dynamic braking resistor 40, the chopper 41 is repetitively turned on and off by the controller 37 so as to vary the average magnitude of current in the resistor 40 as desired. In accordance with common practice, whenever the voltage on the line 33 rises above a predetermined level (e.g., 780 volts) with respect to ground potential, the chopper control automatically responds in a voltage regulating manner that limits further voltage rise, thereby preventing this line voltage from exceeding a safe maximum level.

Regenerative braking is effected by returning reversely-flowing power to the third rail. During this mode of braking, braking current from the positive d-c terminal 31 of the inverter 30 flows through the line 33, the switch means 34, the thyristor branch of the switch means 36, and the shoes 12 and 13 to the third rail. Regenerated power can be used for propelling other vehicles in contact with the same third rail conductor. If the power demands of such other vehicles were insufficient to use all of the electrical braking energy, the voltage on line 33 would increase until the chopper controls respond by varying the on-off ratio of the chopper 41 so that more energy is dissipated in the dynamic braking resistor 40.

A low-pass electrical filter is connected between the circuit breaker 34 and the d-c terminals of the inverter 30. As is shown in FIG. 2, this filter comprises a series inductance L in the bi-directional current path between the line 33 and the breaker 34, a first shunt capacitance C1 directly connected between the positive and negative terminals 31 and 32 of the inverter, and a second shunt capacitance C2 connected across the dynamic braking circuit between the line 33 and ground. During motoring, the first capacitance serves mainly as the required "stiff" voltage source for the inverter 30. During electrical braking this particular filter cooperates with the resistor-diode combination 32R, 32D in an advantageous manner that is explained in the previously referenced U.S. Pat. No. 4,904,918—Bailey et al. Although not shown in FIG. 2, it is normal practice to add to the propulsion system a second pair of traction motors drivingly-coupled to the axle-wheel sets of the second truck of the vehicle 10 and electrically connected to the load terminals of a second voltage source inverter whose positive d-c terminal is connected directly to the line 33 and whose negative d-c terminal is connected through another resistor-diode combination to ground, with a second dynamic braking circuit being connected in parallel relationship to the d-c terminals of the second inverter, and preferably with the "on" period of the two choppers being staggered with respect to each other during dynamic braking operation. The vertical arrows in FIG. 2 are intended to represent the interconnections between the illustrated components of the propulsion system and such added components.

The circuit breaker 34 is a controllable electric switch having alternative conducting and non-conducting states. In its conducting state, which is normal, the main contacts of the breaker 34 are closed, whereas in a nonconducting state such contacts are open and therefore current in the bi-directional path will be interrupted. The breaker contacts are opened and closed by an associated operating mechanism (labeled "LB" in FIG. 2) in response to appropriate commands issued by the controller 37 whenever a state change is desired. As is indicated in FIG. 2, the isolating switch 35 has a companion switch 35a that is used to connect auxiliary load circuits 42 to the switch means 36 and hence to the shoes 12, 13 that are in sliding contact with the third rail. The auxiliary circuits comprise the vehicle's lighting and heating systems, air compressors, battery charger, and the like.

In accordance with the present invention, the controllable switch means 36 of the propulsion system comprises a solid-state uncontrolled unidirectional electrical valve 43 in combination with a parallel solid-state controlled unidirectional electric valve 44. The uncontrolled valve 43 is a power-rated diode poled to conduct direct current in a direction from the shoes 12, 13 to the positive d-c terminal 31 of the inverter 30. Thus the switch means 36 will always be in a conducting state if the third rail is energized, the breaker 34 is closed, and the inverter 30 is operating in its motoring mode. The controlled valve 44 in the parallel branch of the switch means 36 is a power-rated thyristor poled inversely with respect to the diode 43. In one practical application of the invention the thyristor 44 is rated to conduct load current having an average magnitude of approximately 1,000 amperes and to withstand a forward voltage having a peak magnitude over 3,000 volts when in its non-conducting state. As is shown in FIG. 2, a series RC snubber circuit 45 is connected across the diode 43 and the thyristor 44.

Once a suitable firing signal is applied to the control electrode or gate of the thyristor 44 and while the inverter 30 is operating in an electrical braking mode, the switch means 36 is able to conduct regenerative braking current from the positive terminal 31 of the inverter via the line 33 to the shoes 12, 13 and hence to the section of the third rail with which either shoe is in contact. This current conducting state will continue until the regenerative current decreases to zero, at which time the thyristor 44 will automatically change from conducting (on) to non-conducting (off) states. The thyristor achieves this on-to-off transition by an inherent commutation process whenever it is starved of load current. The thyristor gate is connected to suitable firing signal generating means 46 that is operative to supply the aforesaid firing signal in response to a discrete command issued by the controller 37 whenever it is desired to return the thyristor 44 to the on state. Preferably the firing signal generating means 46 comprises a pulse stretcher that responds to the leading edge of the firing command by activating a burst generator for a predetermined short interval of time (e.g., approximately one millisecond). The burst generator in turn activates a suitable gate driver which then applies to the gate of the thyristor 44 a firing signal comprising a train of short pulses corresponding in frequency to the output of the burst generator.

The operation of the controllable switch means 36 will now be summarized. Assume that the vehicle 10 is approaching the third rail gap shown in FIG. 1 while the inverter 30 is operating in an electrical braking mode and regenerative current has been enabled by an earlier firing signal from the generator 46. Under such conditions the circuit breaker 34 is closed, the thyristor 44 is on, and the switch means 36 is therefore conducting regenerative current. At this time the regenerated power delivered by the propulsion system on board the vehicle 10 to the third rail conductor 15 is being utilized by other electrical loads (not shown) connected to the same conductor (e.g., other vehicles operating in motoring modes and having shoes in contact with the conductor 15). As a desirable result of such regeneration, the power drain on the wayside voltage source 19 is reduced a corresponding amount.

As soon as the vehicle 10 reaches the third rail gap D and its trailing shoe 13 separates from the end of the conductor 15, the regenerative current necessarily decreases to zero. Consequently the thyristor 44 immediately changes from conducting to non-conducting states. Because of the short time (typically 300 microseconds) required to complete this on-to-off transition, the thyristor 44 will have turned off before (and will not again be turned on when) the leading shoe 12 of the vehicle subsequently makes contact with the proximate end of the next third rail conductor 16 as the vehicle 10 moves past the gap D at maximum speed. In other words, when the shoe 12 first touches the next conductor 16 the switch means 36 will always be in a non-conducting state. At any time thereafter the thyristor 44 can be returned to its regenerative current conducting state by applying another firing signal to its gate, but until then the switch means 36 will remain in a non-conducting state and consequently both of the shoes 12, 13 are electrically isolated from the voltage on the line 33 of the bi-directional current path. Note that after the switch means 36 changes from conducting to non-conducting states an appreciable voltage will remain on the line 33 as long as dynamic braking continues and the filter capacitances C1 and C2 have not discharged. Note also that it is common practice to open the slower operating circuit breaker 34 each time a third rail gap is traversed.

After the vehicle shoes 12, 13 traverse the gap D, regenerative braking operation is desired if the next third rail conductor 16 is energized by a wayside voltage source (i.e., if the circuit interrupter 20 is closed) but is not desired if the next conductor is deenergized or "dead" (i.e., if the interrupter 20 is open). If the conductor 16 were so energized, it would be safe to regenerate power and the controller 37 which is suitably arranged to release the breaker 34 and command another thyristor firing signal. A conventional way to detect this condition is to check the magnitude of the wayside voltage as soon as the leading shoe makes contact with the next conductor. For this purpose the shoe voltage Vdc is supplied to the controller 37 which is suitably arranged to compare the actual magnitude of such voltage with a predetermined threshold magnitude (e.g., 400 volts). As long as Vdc is lower than this threshold, the next conductor 16 is assumed to be deenergized, the switch means 34 and 36 are not returned to their conducting states, and the third rail is protected from being inadvertently energized by the voltage on line 33.

Such a voltage magnitude checking technique is generally useful, but it does not ensure the desired regenerative braking protection under all possible conditions. One such condition would occur if the interrupter 20 is open and another vehicle has a shoe in contact with the conductor 16 while operating in a regenerative braking mode. In this event, the regenerating propulsion system on board the other vehicle could raise the magnitude of Vdc above the 400-volt threshold even though the conductor 16 is disconnected from the wayside voltage source 22. Another condition that can cause the voltage magnitude checking technique to respond falsely would occur if the interrupter 20 were changed from closed to open states after the vehicle 10 moves past the gap D and the switch means 36 has been properly returned to its regenerative current conducting state. In this event the vehicle's own regenerating propulsion system could maintain the magnitude of its shoe voltage above the 400-volt threshold even though the interrupter 20 has opened to disconnect the conductor 16 from the source 22.

It has been observed that the instantaneous magnitude of Vdc is not constant but undulates between maximum and minimum levels due to the sinusoidal waveforms of the alternating voltages that are rectified in the previously described electric power stations 19 and 22. In other words, the third rail voltage is actually a composite of a pure d-c voltage and a superimposed a-c ripple component the amplitude of which is lower than the magnitude of the d-c component. The characteristic ripple has a predetermined fundamental frequency. In the case of third rail sections energized by stations having three-phase rectifier bridges, this frequency will be six times greater than the commercial power frequency, and the characteristic ripple is hereinafter referred to as the 6× ripple component. On the other hand, for third rail sections energized by stations having six-phase rectifier bridges, the characteristic ripple component (12×) will have a fundamental frequency that is 12 times greater than the commercial power frequency. In either case, the fundamental ripple frequency is not the same as the frequency of any significant harmonics generated by operation of the inverter 30 in a regenerative braking mode.

Figure 7:
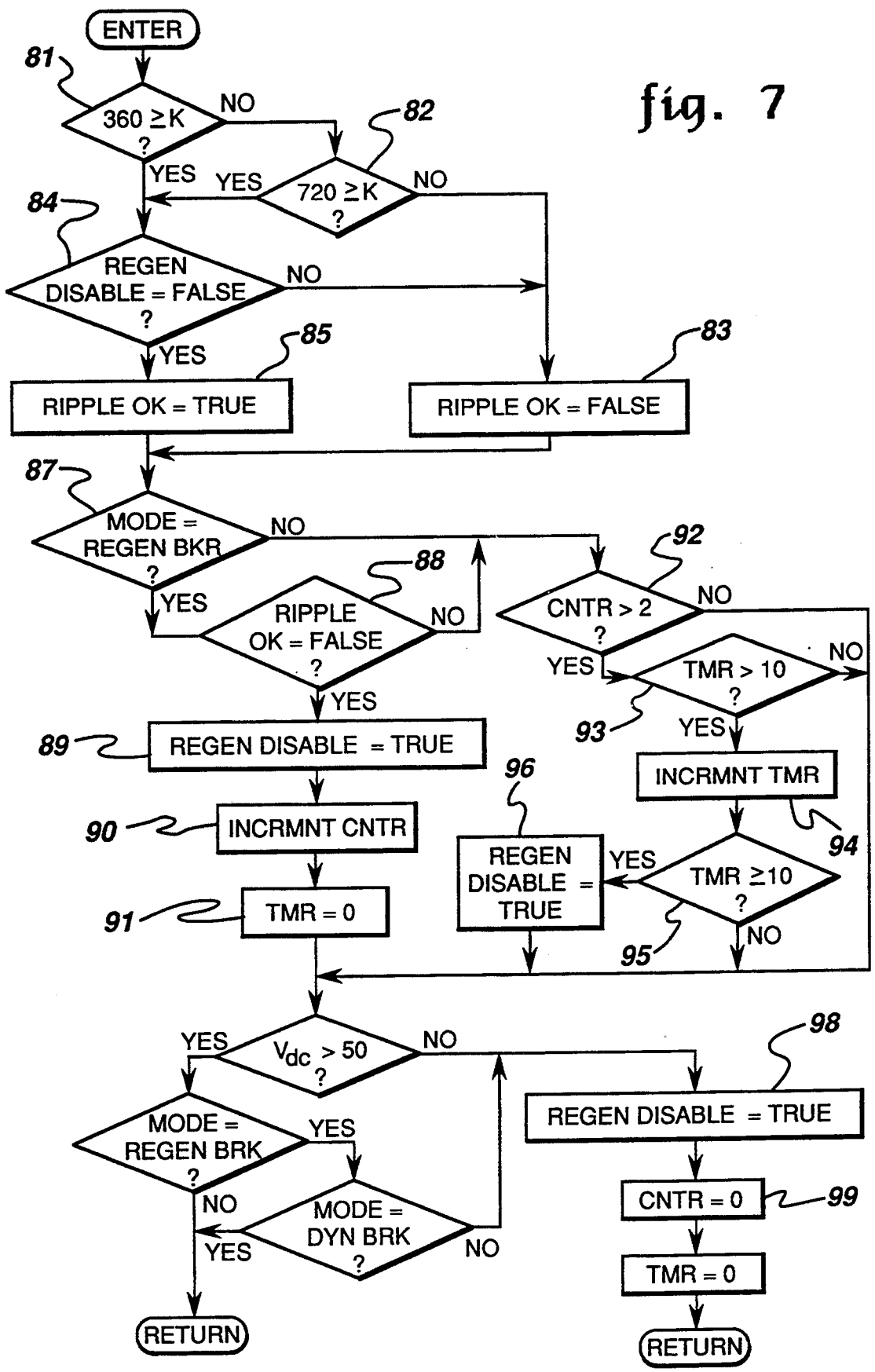

In accordance with the present invention, energization of third rail sections by the wayside source of voltage is detected by providing suitable means for sensing the fundamental frequency of the characteristic a-c ripple component of the third rail voltage and for determining the amplitude of such component. Whenever such a ripple component is present and has at least a predetermined threshold amplitude, the ripple detecting means provides an enable or "ripple OK" signal. In FIG. 2 the ripple sensing means is represented by a single block 48 having an input line connected to the pickup shoes 12 and 13 and two output lines 360 and 720 connected to the controller 37. The ripple sensor 48 provides on line 360 a value representative of the amplitude of any 6× ripple component of the shoe voltage Vdc, and it provides on line 720 a value representative of the amplitude of any 12× ripple component. As will be explained when FIGS. 5-7 are described, the function of determining if either output value of the ripple sensor exceeds a predetermined minimum level is performed in the controller 37.

Preferably the desired ripple sensing function is implemented with active electrical filters. Suitable circuit components and interconnections, design approaches, and advantages of active filters are well known to persons skilled in the art. See, for example, the textbook INTRODUCTION TO THE THEORY AND DESIGN OF ACTIVE FILTERS by L. P. Huelsman and P. E. Allen (McGraw-Hill Book Co. 1980), the disclosure of which is hereby incorporated herein by reference.

For the purpose of the present disclosure, an "active filter" is defined as a network of conventional resistors (R), capacitors (C) and at least one operational amplifier ("OP AMP") connected between input and output terminals and so arranged that whenever the input terminals are excited by a voltage of undulating magnitude the network will develop an output signal representative of input voltage excursions occurring at any frequency substantially within a predetermined range of frequencies and will greatly attenuate all other components of input voltage. The resistors and capacitors in an active filter are passive elements of fixed ohmic and microfarad values, respectively, whereas the OP AMP is the active device. OP AMPs perform several important functions in active RC filters. They enable a filter without inductors to exhibit the resonant effects of complex frequency-magnitude relationships of second and higher orders; they permit significant reductions in the sizes and weights of resistors and capacitors used in a filter that is tuned to a relatively low characteristic frequency; they provide electrical power to offset the power losses in the passive elements of the filter. OP AMPs are particularly useful because of their relatively high input impedance, low output impedance, high open-loop gain, low cost, and high reliability. To accomplish the desired ripple sensing of the present invention, a "bandpass" type of active filter needs to be used. A bandpass filter has a frequency "passband" bounded by two frequency "stopbands." In other words, it readily transmits or passes excitation signal frequencies within a selected frequency range (the passband) while effectively blocking other-frequency components either above or below the selected passband. The frequency difference between high and low limits of the passband is known as the "bandwidth" of the filter.

Figure 3A:
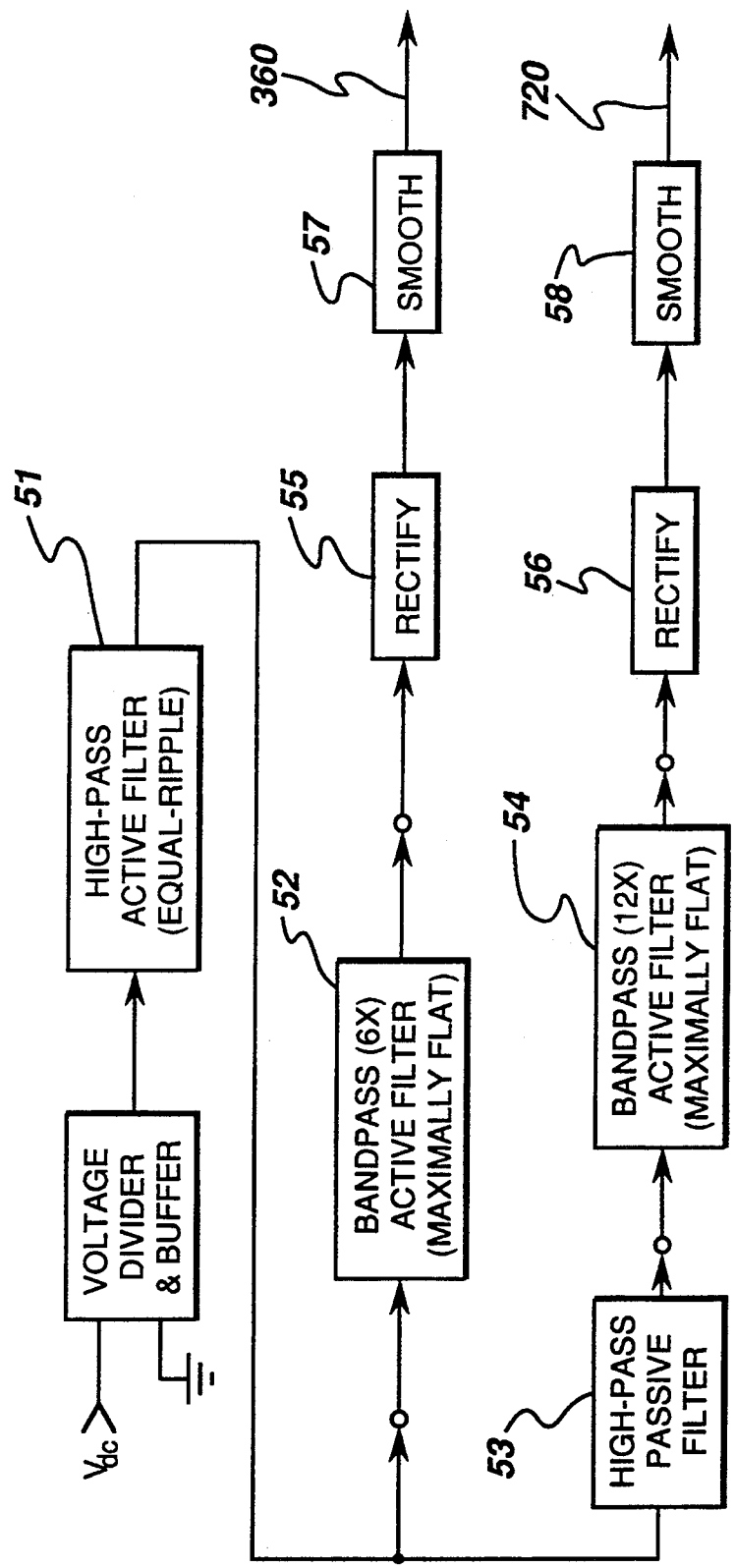
FIG. 3A is an expanded block diagram of the ripple sensing means shown as a single block in FIG. 2.

Active filters are conventionally designed so that their passband magnitude characteristics are either maximally flat ("Butterworth") or equal-ripple ("Chebyshev"). In either case, as is explained in the previously-cited text of Huelsman and Allen (see Chapter 2), an idealized characteristic can be approached by increasing the order (also referred to as the number of poles) of the complex frequency-magnitude relationship that defines the voltage transfer function of the filter. A filter having maximally flat magnitude response differs from a filter having equal-ripple magnitude response in at least two significant respects: the latter filter has a sharper cutoff between passband and stopband (i.e., a steeper rolloff) and greater attenuation of stopband frequencies, whereas the former filter has a more linear phase characteristic and better transient response. To obtain the sharp filtering action and high degree of integrity required in the presently disclosed regenerative braking protective means, the ripple sensor 48 is formed by combining active filters characterized by both kinds of responses in a network as illustrated in FIG. 3A. This combination includes: (1) an initial highpass type active filter 51 that is excited by a voltage proportional to the shoe voltage Vdc, the parameters of this filter being selected for equal-ripple magnitude response and for a "half-power" cutoff frequency (fc) slightly under the lower half-power frequency of the $6\times$ ripple passband; (2) a first bandpass type active filter 52 that is excited by the a-c signals passing through the high-pass filter 51, the parameters of this filter being selected for maximally flat magnitude response, for a center frequency (fo) substantially equal to the fundamental frequency of the $6\times$ ripple component of Vdc, and for unity gain when the excitation frequency equals fo, with the bandwidth of the filter being relatively narrow (i.e., the difference between the two half-power frequencies respectively above and below fo is a small percentage, such as 5 or 6 percent, of fo); (3) an interstage high-pass type passive filter section 53 that is also excited by the a-c signals passing through the initial high-pass filter 51; and (4) a second bandpass type active filter 54 that is excited by the a-c signals passing through the high-pass filter 53 and is essentially a duplicate of the filter 52 except for being tuned to a center frequency substantially equal to the fundamental frequency of the $12\times$ ripple component of Vdc. (Persons skilled in the art will understand that a half-power frequency is any excitation frequency at which the output voltage of a filter is 70.7 percent of its peak magnitude which in turn is obtained, in the case of a bandpass filter, at the center frequency. In logarithmic units, the magnitude at this frequency is down 3 decibels [$-3$dB] from the peak magnitude.)

Figure 3B:
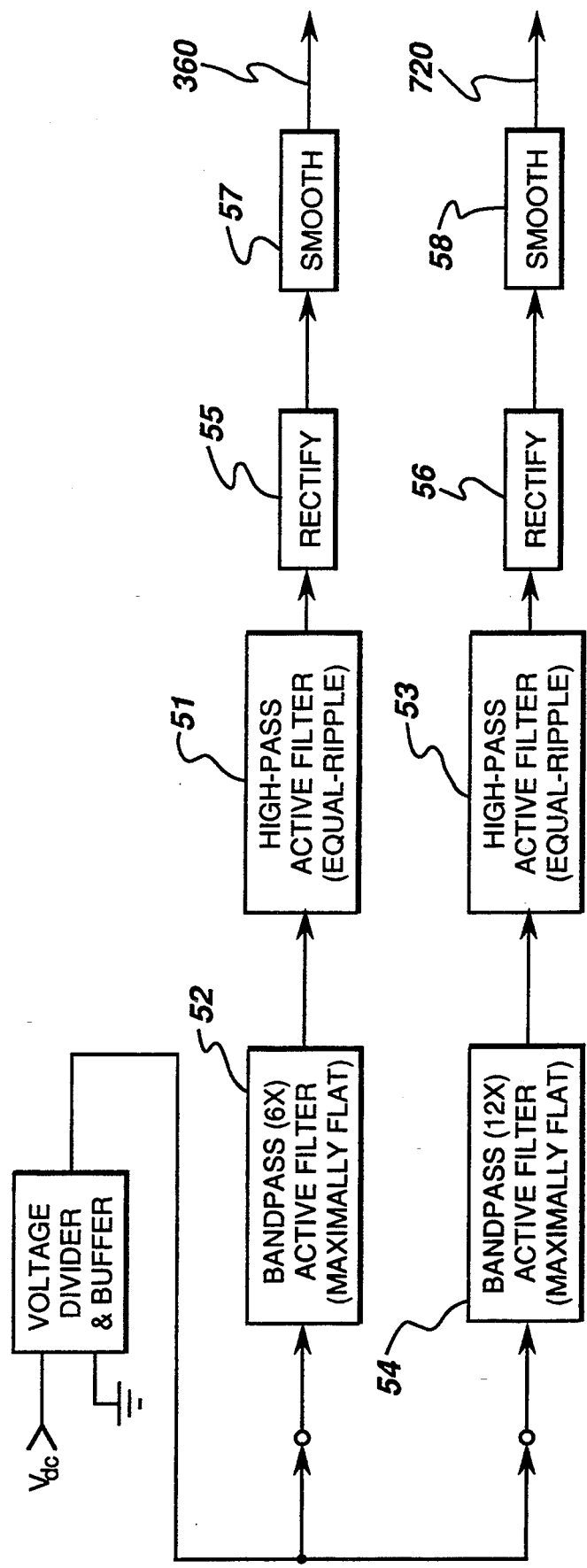
FIG. 3B is an alternative expanded block diagram of the ripple sensing means of FIG. 2.

As illustrated in FIG. 3B, in an alternative construction, the bandpass filters 52, 54 are placed before the high-pass filters with the same end result as explained above.

The ripple sensor 48 also includes a pair of precision rectifier circuits 55 and 56 connected to the output terminals of the respective bandpass filters 52 and 54. These circuits rectify any signals passing through the bandpass filters. The rectified signals are respectively supplied to a pair of smoothing circuits 57 and 58 comprising conventional low-pass filters for deriving on the lines 360 and 720 corresponding output values that vary with the average magnitudes of the signals supplied by the rectifier circuits 55 and 56 respectively. Consequently the values on the output lines 360 and 720 are respectively representative of the amplitudes of the $6\times$ and $12\times$ ripple components of Vdc.

Figure 4A:
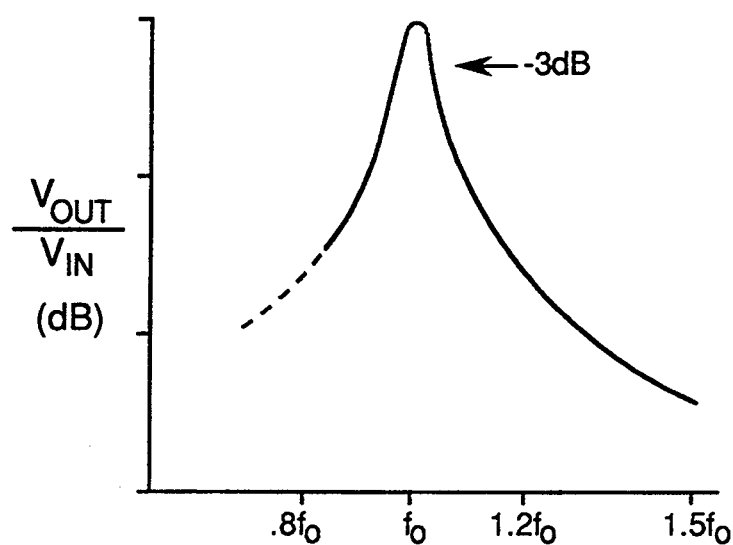
FIGS. 4A and 4B are graphs of magnitude attenuation vs. excitation frequency for active filters used in the ripple sensing means to obtain bandpass and high-pass characteristics, respectively.

Preferably the first bandpass filter 52 is a fourth order, unity gain active filter formed by connecting two separate second order filter modules in a conventional cascade arrangement. A practical design for each module is described on pages 218–20 and 258–61 of the Huelsman and Allen textbook. The filter 52 comprises two duplicate modules of this kind interconnected with multiple feedback in the manner indicated in FIGS. 6.3–12 and 6.4–1 on pages 301 and 303 of the same text. These modules are synchronously tuned to a center frequency equal to the fundamental frequency of the $6\times$ ripple voltage on the third rail. For example, if the a-c power frequency were 60 Hz, fo=360 Hz. If some drift were expected, a desirable bias could be provided by adding an extra 5 Hz to this center frequency. The $-3$ dB bandwidth (BW) of the bandpass filter 52 is approximately 5.5 percent of fo (e.g., 20 Hz). The resulting relationship between the voltage transfer function of this filter and the excitation frequency is shown in FIG. 4A. The same results could be obtained by alternatively designing each of the cascaded second-order filter modules in accordance with the "Delyiannis-Friend" bandpass circuit described on pages 203–07 of the textbook ANALOG FILTER DESIGN by M. E. Van Valkenburg (Holt, Rinehart and Winston, 1982).

Figure 4B:
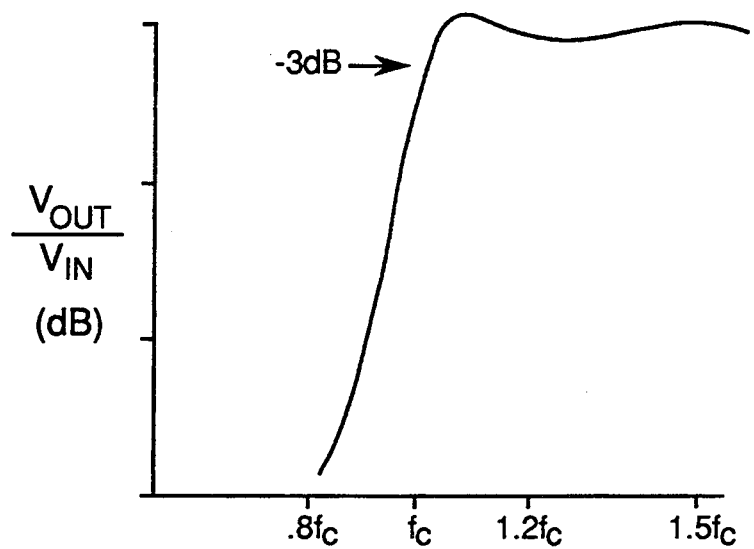

Preferably the high-pass filter 51 is a third order, single-amplifier active filter similar to the "Sallen and Key" filter shown in FIG. 4.3–2 on page 164 of the Huelsman and Allen text. This filter is so designed that its passband ripple amplitude is 0.5 dB and its $-3$ dB cutoff frequency fc is approximately 5.5 percent lower than the center frequency of the bandpass filter 52. For example, fc=340 Hz, which is only 10 Hz less than the lower limit of the bandwidth of the $6\times$ bandpass filter 52. The resulting relationship between the voltage transfer function of this filter and the excitation frequency is shown in FIG. 4B.

In operation, the filters 51 and 52 selectively pass any 360 Hz a-c ripple in Vdc with virtually no attenuation, and therefore the value on the output line 360 of the ripple sensor will be an accurate measure of the amplitude of such ripple. However, the filtering action of these two filters will greatly attenuate any ripple voltage having frequencies above 370 Hz or below 350 Hz, whereby the output value on the line 360 is not appreciably increased by any such stopband ripple (e.g., communication signals) as may be present in Vdc. The combined effects of the sharp cutoff contributed by the equal-ripple high-pass filter 51 and the narrow bandwidth contributed by the maximally flat bandpass filter 52 will provide a desired attenuation of more than $-30$ dB at an excitation frequency of 300 Hz. Thus unwanted low frequency noise below the passband of interest is effectively eliminated from the signal developed at the output terminals of the bandpass filter 52.

Preferably the second bandpass filter 54 is constructed and arranged in essentially the same manner as the first bandpass filter 52. However, the second filter 54 is tuned to a center frequency (e.g., 720 Hz) that is twice the center frequency of the first bandpass filter, and preferably the ohmic values of certain resistors in the second filter are chosen so that this filter has a small positive gain (e.g., 1.1) when its excitation frequency and center frequency coincide. The $-3$ dB bandwidth of the second bandpass filter is approximately 40 Hz.

The high-pass filter section 53 between the input terminals of the second bandpass filter 54 and the initial high-pass active filter 51 is preferably a conventional second order RC network having a $-6$ dB cutoff frequency (e.g., 370 Hz) that is higher than the center frequency of the first bandpass filter 52. In operation, the filters 51, 53, and 54 selectively pass any 720 Hz ripple in Vdc with virtually no attenuation, and therefore the value on the output line 720 of the ripple sensor 48 will be an accurate measure of the amplitude of such ripple. However, their filtering action will greatly attenuate any ripple voltages having frequencies above 740 Hz or below 700 Hz, whereby the output value on the line 720 is not appreciably increased by any such stopband ripple as may be present in Vdc.

The values on the two output lines 360 and 720 of the ripple sensing means 48 are used in the controller 37 for the purpose of deciding whether or not the propulsion system will operate in a regenerative braking mode when electrical braking is desired. As previously explained, the thyristor branch of the switch means 36 (see FIG. 2) will automatically change from conducting to non-conducting states each time the vehicle 10 enters a third rail gap while operating in a regenerative braking mode. After the vehicle moves past the gap and its leading shoe has made contact with the next third rail conductor, as soon as the controller 37 determines that there is a value on either of the two output lines 360 and 720 in excess of a predetermined minimum level it will issue a closing command to the breaker mechanism LB so as to reclose the circuit breaker 34 and a firing command that enables the firing signal generating means 46 to apply a suitable firing signal to the gate of the thyristor 44 which then returns to its regenerative current conducting state. In the remainder of this specification a practical way to implement the functions summarized in this paragraph will be disclosed.

In the preferred mode of practicing the invention, the controller 37 is a microcontroller comprising a coordinated system of commercially available microcomputer components and associated electrical circuits and elements that can be programmed to perform a variety of desired functions. A flow chart of presently-relevant steps in one such program is displayed in FIG. 5 and will now be described. The FIG. 5 program is automatically executed by the microcontroller 37 every 10 milliseconds. It begins with a routine 61 of "checking" the ripple sensor output values on lines 360 and 720. Relevant details of the ripple checking routine 61 will soon be explained with reference to FIG. 7. As will be apparent when FIG. 7 is described, this routine includes means for setting a "ripple OK" flag in a true state if either one of the ripple output values exceeds the minimum level.

The next step 62 in the FIG. 5 program decides whether or not an electrical braking mode of operation is desired. If no braking mode is scheduled, other routines 64 that are not presently relevant will be performed. But if the vehicle operator has called for electrical braking, the program proceeds from the step 62 to an inquiry 65 as to whether or not either dynamic or regen braking mode was true previously. On the first pass through the FIG. 5 program after the brake call is initiated, the answer to inquiry 65 is negative and the program will proceed directly to a dynamic braking sequence of steps comprising a step 66 that issues an opening command to the previously described breaker mechanism LB (which mechanism responds thereto by moving the circuit breaker 34 to its open or non-conducting state, thereby disconnecting the line 33 in the bi-directional current path from the switch means 36), a step 67 that loads a binary word unique to dynamic braking in a "present mode" register, and a step 68 that initiates operation of the inverter 30 in an electrical braking mode. With the breaker 34 in its non-conducting state, the braking mode will be solely dynamic braking.

For as long as electrical braking continues to be called for, every time the FIG. 5 program is executed after the above-described first pass through the dynamic braking sequence, the answer to the inquiry 65 will be affirmative and the program will proceed from inquiry 65 to another inquiry step 70 that looks at the word saved in the present mode register to determine whether or not the present mode is regenerative braking. Initially the present mode is not regenerative braking, and therefore the program proceeds to yet another inquiry step 71 that will determine whether to enable regenerative braking or not. The step 71 actually comprises a series of inquiries the relevant parts of which are shown in FIG. 6.

The first inquiry 72 in step 71 looks at the state of the ripple OK flag and responds affirmatively if the state is true. The ripple OK flag is true if the shoe voltage Vdc has either a 6× or a 12× ripple component of appreciable amplitude (see FIG. 7). As is indicated in FIG. 6, if the answer to inquiry 72 is yes there is another inquiry 73 to determine whether or not Vdc has a magnitude greater than a predetermined level G (e.g., 400 volts). (In practice, an affirmative answer is not obtained at inquiry 73 until Vdc has remained greater than G for 50 milliseconds.) It will be apparent that if either one of the shoes 12 and 13 were in contact with a deenergized section of the third rail, or if both shoes were not in contact with the third rail (e.g., both shoes in a third rail gap), the answer to inquiry 73 would be no. However, if either shoe were in contact with an energized third rail conductor, Vdc would exceed G and the answer to the inquiry 73 is yes, in which event the next inquiry 74 in the step 71 determines whether or not the magnitude of Vdc is less than a predetermined high magnitude H (e.g., 825 volts). An affirmative answer to the inquiry step 71 is obtained if the answer to its third inquiry 74 is yes, but a negative answer will be obtained if the answer to at least one of the three constituent inquiries 72, 73 and 74 is no.

As long as the answer to the inquiry step 71 is negative, the FIG. 5 program ends here and the propulsion system continues to operate in the dynamic braking mode that was initiated by the above-described first pass through. However, when the answer to the inquiry 71 is affirmative, the program will proceed from this step to a regenerative braking sequence of steps comprising a step 75 that resets (if necessary) the firing command, a step 76 that issues a closing command to the breaker mechanism LB (which mechanism responds thereto by returning the circuit breaker 34 to its conducting state, thereby reconnecting the line 33 to the switch means 36), a step 77 that issues a discrete firing command to the firing signal generating means 46 (which responds thereto by applying a suitable firing signal to the gate of the thyristor 44, thereby changing the switch means 36 from a nonconducting state to a conducting state), a step 78 that loads a binary word unique to regenerative braking in the present mode register, and a step 79 that initiates operation of the inverter 30 in a regenerative braking mode. With both the breaker 34 and the switch means 36 in conducting states, the electrical braking mode will actually be a blend of dynamic and regenerative braking.

The next time through the FIG. 5 program after regenerative braking commences, the inquiry step 70 will have an affirmative answer, and the program will therefore proceed from inquiry 70 to an alternative inquiry step 80 that is the same as the multi-part inquiry step 71 shown in FIG. 6. As long as the answer to the inquiry 80 is affirmative, the FIG. 5 program ends here and the propulsion system continues to operate in the regenerative braking mode. However, if the third rail conductor with which the vehicle's shoes are in contact were disconnected from its wayside source of voltage, or when the vehicle reaches the next third rail gap, the answer to the inquiry step 80 will be negative instead of positive, and the program will now proceed from this step to the dynamic braking sequence of steps 66–68 previously described. As a result, regenerative current being conducted by the thyristor 44 decreases to zero (either because the circuit breaker 34 stopped conducting when step 66 was executed, or because the vehicle shoes entered the aforesaid gap, whichever occurs first). Now the previously conducting switch means 36 automatically changes to its non-conducting state where it will remain until the next time the regenerative braking sequence of steps 75–79 are executed.

FIG. 7 shows relevant details of the previously mentioned ripple-checking routine 61. This routine begins with an inquiry step 81 that performs the function of a bistable level detector: if the actual value on output line 360 of the ripple sensing means 48 equals or exceeds a certain level K, the answer to inquiry 81 is affirmative; otherwise the answer is negative. K is the value derived by the ripple sensor 48 whenever the 360 Hz ripple component of Vdc has a predetermined threshold amplitude that is relatively low but measurable (e.g., approximately 0.25% of the average magnitude of normal wayside voltage). If this value is lower than K, the routine 61 proceeds from the inquiry 81 to a similar inquiry step 82 that compares the actual value on the output line 720 of the ripple sensor with K. If the answer to the inquiry 82 is also negative, there is neither a 360 Hz nor a 720 Hz ripple in the third rail voltage and the next step 83 is to set the ripple OK flag in a "false" state. This signals that regenerative braking is impermissible and prevents execution of the regenerative braking sequence of steps 75–79 in the FIG. 5 program. On the other hand, if either the 360 Hz ripple component or the 720 Hz ripple component has an appreciable amplitude (i.e., an amplitude that equals or exceeds the aforesaid threshold), the ripple OK flag is set in its true state by a step 85 (after executing another inquiry step 84 that will soon be explained). In the manner described above with reference to FIGS. 5 and 6, the true state of the ripple OK flag serves as a signal enabling regenerative braking to be effected. By checking for either a characteristic 6× ripple component or a characteristic 12× ripple component of Vdc, the ripple detecting means will respond correctly regardless of whether the wayside voltage source energizing the third rail section along which the vehicle 10 is traveling incorporates a three-phase or a six-phase power rectifying bridge. Note that each time the state of the ripple OK flag changes from true to false while electrical braking is in effect, the enable signal will terminate and the inquiry step 80 in the FIG. 5 program will respond by initiating execution of the dynamic braking sequence 66–68.

The inquiry step 84 and the other steps occurring after step 83 or 85 of the ripple checking routine 61 are provided because of a potential problem that will now be explained. During regenerative braking, the d-c component of Vdc tends to increase to a relatively high magnitude if the third rail is not sufficiently receptive to the regenerated power, and there is a possibility that the output value of the ripple sensing means 48 could fall below K even though the third rail is not disconnected from its wayside voltage source. In the event the ripple OK flag is changed from true to false states for this reason, the FIG. 5 program will change the electrical braking mode from regenerative braking to dynamic braking as previously described. Vdc will now decrease until the ripple sensor output value rises to K at which time the ripple OK flag returns to its true state, and consequently the FIG. 5 program will now restore regenerative braking.

Frequent cycling in and out of the regenerative braking mode is undesirable. In order to limit such cycling to a predetermined maximum number (e.g., two) while the propulsion system continues to operate in an electrical braking mode and Vdc has an appreciable magnitude (e.g., greater than 50 volts), the ripple checking routine 61 includes a "regen disable" flag that initially is in a false state. The inquiry step 84 will not inhibit the abovedescribed operation of the ripple detecting means as long as the regen disable flag remains in its false state. But steps 87, 88 and 89 of the routine 61 will set this flag in its true state each time the ripple OK flag changes from true to false states while regenerative braking is in effect, and concurrently a step 90 will increment by 1 the binary number in a "cycle counter" register of the microcomputer. While the regen disable flag is true, the ripple OK flag is "locked" in its false state by the inquiry step 84, whereby regenerative braking is prevented. So long as the cycle count is less than two, 100 milliseconds after step 89 was executed the regen disable flag will be automatically reset to its initial, false state by steps 91–96 of the routine 61, and as soon thereafter as either a 6× or a 12× ripple component of appreciable amplitude is detected the ripple OK flag is again set in its true state and regenerative braking is able to resume. However, once the cycle count reaches two, the reset step 96 is bypassed, the regen disable flag is not returned to its false state, the ripple OK flag remains locked in its false state, and consequently the regenerative braking sequence of steps 75–79 cannot be executed. Within 50 milliseconds after Vdc falls below 50 volts (as will occur each time the vehicle's shoes 12, 13 enter a third rail gap) or the electrical braking mode is discontinued, step 98 of the routine 61 will set the regen disable flag in its initial, false state, and a step 99 will reset the cycle counter to its initial count of 0.

In practice there is a possibility that the thyristor 44 will not stay turned on when step 77 of the FIG. 5 program is executed (i.e. when a firing command is issued) due to bouncing of the pick-up shoes 12, 13 on the third rail or due to a very low initial magnitude of regenerative current or due to some other transient condition (e.g., a coating of ice on the third rail conductor) that results in the thyristor being back-biasedtemporarily. Under such abnormal conditions, regenerative braking could not actually commence (or would unintentionally be discontinued) even though the regenerative braking enabling sequence of steps 75–79 were properly executed. To address this potential problem, the microcontroller 37 includes a special "auto re-fire" program that is displayed in FIG. 8 and will now be described.

Figure 8:
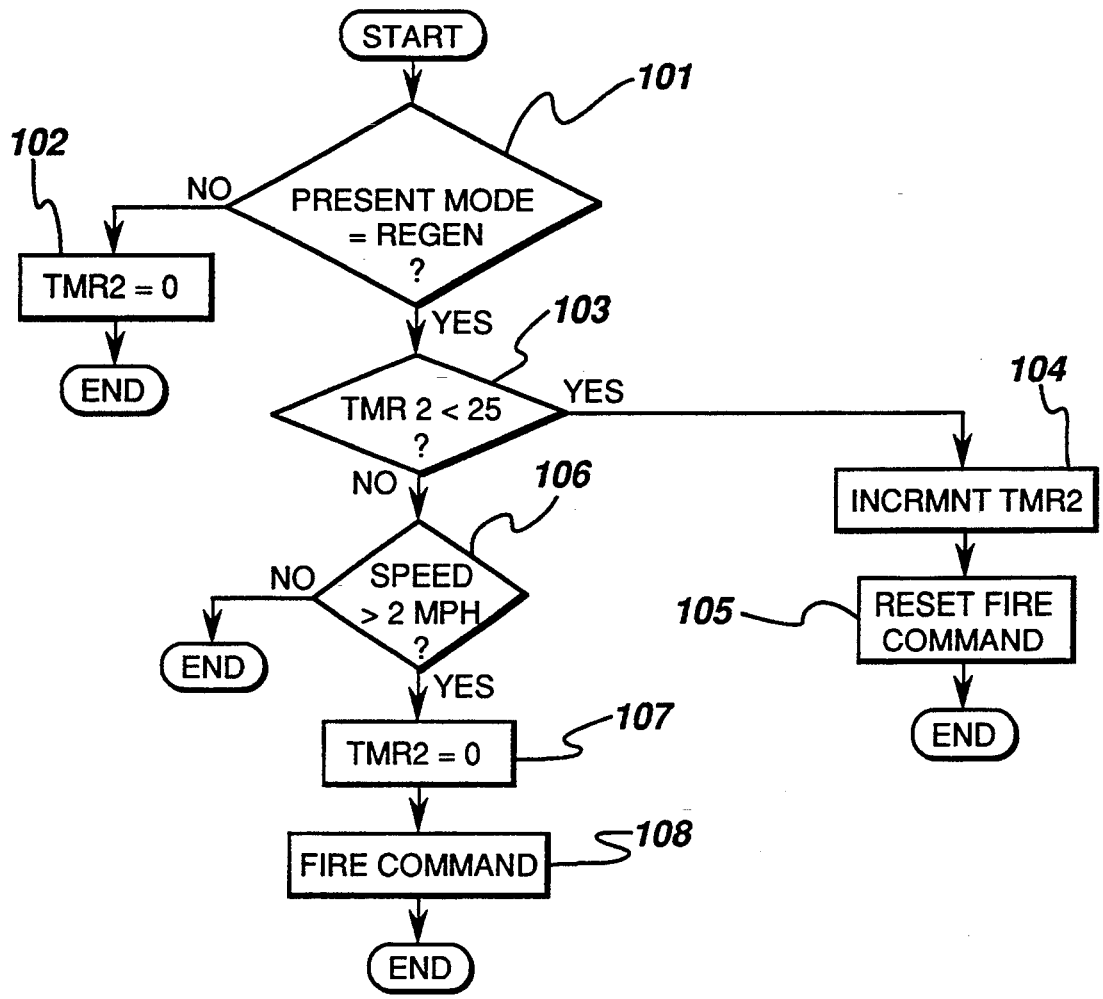

The auto re-fire program is automatically executed every 50 milliseconds. As is indicated in FIG. 8, it begins with an inquiry step 101 that looks at the word saved in the present mode register to determine whether or not regenerative braking is the presently designated mode of operation. If not, the binary number stored in a "timer" register (TMR2) is set at 0 by a step 102, and then the auto re-fire program ends. But if the propulsion system is intended to be operating in a regenerative braking mode, the auto re-fire program proceeds from inquiry 101 to a second inquiry 103 as to whether or not the number saved in TMR2 is less than 25. If the answer is affirmative, the program will end after incrementing the timer register by one at a step 104 and resetting (if necessary) the firing command at a step 105. Alternatively, if the answer to inquiry 103 were negative (as is true every 25th pass through the auto re-fire program), the next step 106 in this program would be to determine whether or not the speed at which the vehicle 10 is traveling exceeds a predetermined relatively low velocity (e.g., 2 MPH). If not, the auto re-fire program ends here regardless of whether or not the propulsion system is then operating in its regenerative braking mode. Otherwise, two additional steps 107 and 108 are executed before ending the program. Step 107 resets the number in the timer register to 0, and step 108 issues another discrete firing command to the firing signal generating means 46. As a result, firing signals are periodically reapplied to the gate of the thyristor 44 during regenerative braking operation. If the thyristor fails to turn on when regenerative braking was supposed to commence, or if at any time it unintentionally turns off while regenerative braking is enabled, the auto re-fire program ensures that another firing signal is supplied within 1.25 seconds, thereby returning (if necessary) the thyristor to its regenerative current conducting state.

While only one embodiment of the invention has been shown and described by way of example, many modifications will undoubtedly occur to persons skilled in the art. The concluding claims are therefore intended to cover all such modifications that fall within the true spirit and scope of the invention.

We claim:

1. A braking protective system for an electrical propulsion system, the system comprising:
    a controllable electric power converter having a set of load terminals adapted to be connected to at least one traction motor and a pair of d-c terminals adapted to be connected to a normally energized wayside electric power station having at least one fundamental frequency, the wayside electric power station being the sole source of such fundamental frequency, the converter having alternative motoring and electrical braking modes of operation, the wayside source comprising electrical conductor means respectively extending along different sections of a right-of-way traveled by the vehicle, with proximate ends of the conductor means in adjacent sections being separated from each other by relatively short, insulating gaps, the vehicle being equipped with at least one current collector in sliding contact with the wayside conductors as the vehicle moves along the right-of-way, the current collector and the converter's d-c terminals being interconnected by controllable electric switch means having alternative conducting and non-conducting states;
    voltage ripple detecting means, coupled to the vehicle's current collector, for providing an enable signal if the current collector is in contact with a wayside conductor that is energized by voltage having an a-c ripple component of the fundamental frequency and at least a predetermined threshold amplitude;
    means, operative when the converter is operating in its electrical braking mode, for changing the controllable switch means from conducting to non-conducting states in response to the current collector traversing each wayside conductor gap as the vehicle moves from one section of the right-of-way to the next section; and
    control means, effective when the converter is operating in a braking mode and the switch means is in a non-conducting state, for returning the switch means to its conducting state in response to an enable signal being provided by the ripple detecting means.

2. The system of claim 1, wherein the at least one fundamental frequency is approximately 360 Hertz.

3. The system of claim 1, wherein the at least one fundamental frequency is approximately 720 Hertz.

4. The system of claim 1, wherein the voltage ripple detecting means is arranged so as to provide an enable signal if the voltage energizing the wayside conductor has a ripple component of appreciable amplitude and of either a fundamental first frequency or fundamental second frequency different than the fundamental first frequency.

5. The system of claim 4, wherein the second fundamental frequency is approximately twice the first fundamental frequency.

6. The system of claim 5, wherein the first fundamental frequency is approximately 360 Hertz.

7. The system of claim 1 wherein the controllable switch means further comprises:
    a solid-state uncontrolled unidirectional electric valve for conducting direct current whenever the converter is operating in its motoring mode:
    a parallel, solid-state controlled unidirectional electric valve, once a suitable firing signal is applied to its control electrode, for conducting regenerative braking current to the wayside voltage source while the converter is operating in its electrical braking mode, the controlled valve automatically changing from conducting to non-conducting states whenever regenerative current decreases to zero as a result of the vehicle's current collector traversing a wayside conductor gap, the control means being arranged to supply the firing signal to the controlled valve in response to an enable signal being provided by the ripple detecting means after the current collector makes contact with the wayside conductor associated with the next section of the right-of-way.

8. The system of claim 7, wherein the uncontrolled valve is a power-rated diode and the controlled valve is a power-rated thyristor.

9. The system of claim 1, wherein the voltage ripple detecting means comprises:
    an electrical filter network for deriving an output value representative of the amplitude of the a-c ripple component of current collector voltage having the at least one fundamental frequency; and
    level detecting means responsive to the output value for providing the enable signal if the output value exceeds a level corresponding to the threshold amplitude.

10. The system of claim 9, wherein the threshold amplitude is equal to approximately 0.25 percent of the average magnitude of normal current collector voltage.

11. The system of claim 9, wherein the filter network comprises:
    a bandpass type active filter having input and output terminals a maximally flat passband magnitude response, a center frequency substantially equal to the fundamental frequency, and a −3 dB bandwidth that is a relatively small percentage of the center frequency;

a high-pass type filter, operatively connected to the input terminals of the bandpass filter and adapted to be excited by the current collector voltage, the high-pass filter having equal-ripple passband magnitude response and a −3 dB cutoff frequency that is lower than the center frequency of the bandpass filter;

rectifying means, operatively connected to the output terminals, for rectifying any signal passing through the bandpass filter; and signal smoothing means, operatively connected to the rectifying means, for deriving those output value which varies with the average magnitude of the rectified signal supplied by the rectifying means.

12. The system of claim 11, wherein the high-pass filter is a third order, single-amplifier active filter.

13. The system of claim 12, wherein the filter network further comprises:

a high-pass type passive filter section operatively connected between the high-pass active filter and the input terminals of the bandpass filter.

14. A regenerative braking protective system for an electrical propulsion system on board a traction vehicle, the system comprising:

a controllable electric power converter having a set of load terminals adapted to be connected to at least one traction motor and a pair of d-c terminals connected via a bi-directional current path to at least one current collector on the vehicle, the current collector being disposed in sliding contact with an external conductor along a right-of-way traveled by the vehicle, the conductor being energized by a wayside electric power station having at least one fundamental frequency to which it is normally connected, the wayside electric power station being the exclusive source of such fundamental frequency, the current path including a normally-closed circuit breaker that will interrupt current in this path when opened, and the converter having alternative motoring and electrical braking modes of operation;

controllable switch means connected between the current collector and the circuit breaker in the bi-directional current path, and comprising a solid-state uncontrolled unidirectional electric valve that is poled to conduct direct current whenever the converter is operating in its motoring mode, in combination with a parallel, inversely-poled, solid-state controlled unidirectional electric valve that is able, once a suitable firing signal is applied to its control electrode, to conduct regenerative braking current while the converter is operating in its electrical braking mode, the controlled valve automatically changing from conducting to non-conducting states whenever regenerative current decreases to zero;

bistable detecting means having a first state if the external conductor with which the current collector is in contact is energized by the fundamental frequency from the wayside electric power station and having a second state otherwise; and means effective when the converter is operating in a braking mode for applying the firing signal to the controlled valve in response to the detecting means changing from its second state to its first state.

15. The system of claim 14 further comprising:

means, effective when the converter is operating in a braking mode and there is appreciable voltage at the vehicle's current collector, for opening the circuit breaker in response to the detecting means changing from its first state to its second state and for thereafter reclosing the circuit breaker in response to the detecting means returning to its first state.

16. The system of claim 14 wherein the external conductor comprises a third rail.

17. The system of claim 14 wherein an electrical filter comprising a series inductance and at least one shunt capacitance is connected between the circuit breaker and the d-c terminals of the electric power converter.

18. The system of claim 14, wherein the bistable detecting means further comprises:

voltage ripple detecting means, the first state of this means being true if the voltage at the vehicle's current collector has an a-c ripple component of the at least one fundamental frequency and at least a predetermined threshold amplitude.

19. The system of claim 18, wherein the ripple detecting means is arranged to be in the first state if the voltage energizing the external conductor has a ripple component of appreciable amplitude and if either a fundamental first frequency or a fundamental second frequency is different than the first frequency.

20. The system of claim 18, wherein the voltage ripple detecting means further comprises:

an electrical filter network for deriving an output value representative of the amplitude of the a-c ripple component of current collector voltage having the fundamental frequency, and bistable level detecting means responsive to the output value, the first state of the ripple detecting means being true if the output value exceeds a level corresponding to the threshold amplitude.

21. The system of claim 20 wherein the filter network comprises:

a bandpass type active filter having input and output terminals, maximally flat passband magnitude response, a center frequency substantially equal to said fundamental frequency, and a −3 dB bandwidth that is a relatively small percentage of said center frequency; a high-pass type active filter connected to the input terminals of said bandpass filter and adapted to be excited by said current collector voltage, said high-pass filter being characterized by equal-ripple passband magnitude response and a −3 dB cutoff frequency that is lower than the center frequency of said bandpass filter;

rectifying means connected to the output terminals for rectifying any signal passing through the bandpass filter; and signal smoothing means connected to the rectifying means, for deriving the output value which varies with the average magnitude of the rectified signal supplied by the rectifying means.

22. The system of claim 18, wherein the firing signal applying means is disabled if the voltage ripple detecting means changes states a predetermined number of different times while there is appreciable voltage at the vehicle's current collector and the electric power converter continues to operate in an electrical braking mode.

23. The system of claim 14 further comprising:

means operative when the electric power converter is operating in a braking mode and the detecting means is in its first state, for periodically reapplying firing signals to the control electrode of the controlled valve.

24. The system of claim 14 wherein the traction motor is an a-c motor and the electric power converter is a voltage source inverter.

25. The system of claim 24 including a dynamic braking circuit connected in parallel relationship to the d-c terminals of the inverter and comprising the series combination of a dynamic braking resistance and an electric power chopper that can be repetitively turned on and off to control current in the dynamic braking resistance during electrical braking.

26. The system of claim 1 wherein the fundamental frequency is approximately six (6) times the frequency of the wayside electric power station.

27. The system of claim 1 wherein the fundamental frequency is approximately twelve (12) times the frequency of the wayside electric power station.

28. The system of claim 1 wherein the fundamental frequency is approximately six (6) n times the frequency of the wayside electric power station where n is an integer.

* * * * *